Jan. 16, 1945.   T. R. HARRISON   2,367,349
CONTROL APPARATUS
Filed Oct. 2, 1942   2 Sheets-Sheet 1

Inventor
THOMAS R. HARRISON.
By C. B. Spangenberg
Attorney

Patented Jan. 16, 1945

2,367,349

UNITED STATES PATENT OFFICE 2,367,349

CONTROL APPARATUS

Thomas R. Harrison, Wyncote, Pa., assignor to The Brown Instrument Company, Philadelphia, Pa., a corporation of Pennsylvania Application October 2, 1942, Serial No. 460,577

8 Claims. (Cl. 171—95)

The present invention comprises improvements in self-balancing potentiometric measuring and control apparatus, and the general object of the invention is to provide such apparatus with improved means for automatically effecting a safety control action in the event of a measuring thermocouple burn-out, or analogous apparatus failure rendering the apparatus inoperative to properly effect its normal measuring and control actions.

Such a safety control action has been provided for heretofore in potentiometric apparatus of the well known type comprising a galvanometer controlled rebalancing relay mechanism, by disposing or calibrating the galvanometer so that its mechanical zero position is displaced by a small fixed angular amount from its balancing position, i. e. the position in which no rebalancing adjustment of the relay mechanism is required or effected. The direction in which the mechanical zero position of the galvanometer is thus displaced from its balancing position is such that when the galvanometer moves into and remains in its mechanical zero position as a result of a thermocouple burn-out, the relay mechanism will effect the same rebalancing and safety control actions as it would if the thermocouple had not burned out but had been heated above the normal temperature which the apparatus is adjusted to maintain.

While said prior potentiometric apparatus effects the kind of safety control action obtainable with the present invention, the use of such measuring apparatus gives rise to a measuring inaccuracy which the present invention avoids. That measuring inaccuracy results from the fact that when the mechanical zero and balancing positions of the galvanometer are displaced as described, a current flow through the galvanometer is required to hold the latter in its balancing position. In consequence, when the galvanometer is in its balancing position, the measuring apparatus functions as a deflection potentiometer and not as a null type potentiometer, and its measuring accuracy depends upon the relative magnitudes of the potential drop in, and the current flow through the thermocouple and galvanometer. That relation depends upon the thermocouple resistance and upon characteristics of the portion of the measuring apparatus directly responsive to thermocouple voltage, and particularly upon the galvanometer sensitivity. As will be apparent, an increase in the galvanometer sensitivity and a decrease in thermocouple resistance each tend to reduce the thermocouple voltage required to produce a current flow through the galvanometer large enough to deflect the latter from its mechanical zero position into its balancing position.

In the commercial production of potentiometric apparatus of the last mentioned type, the galvanometers and thermocouples employed vary somewhat in sensitivity and resistance, respectively, because the usual quantity production of such apparatus elements such as galvanometers and thermocouples permits minor differences between elements which, superficially considered, are counterparts of one another. While the variations in thermocouple resistance and galvanometer sensitivity so produced are small, they are sufficient to create small but undesirable measuring inaccuracies when installed in potentiometers, all of which have their mechanical zero positions displaced from their responsive balancing positions by a fixed distance determined by a mechanical measurement effected in each case without regard to the resistance of the thermocouple or the sensitivity of the galvanometer employed.

A specific object of the present invention is to provide potentiometric apparatus of the last mentioned type with simple and effective provisions for displacing the galvanometer mechanical zero position from the galvanometer balancing position by an angular distance which is sufficient to insure the desired safety control action in case of thermocouple burn-out or other apparatus failure, but which is not a fixed mechanically measured distance but is a distance determined in the case of each potentiometric assembly by an easily effected electrical measurement or calibration step and which makes the thermocouple voltage required to hold the galvanometer in its balancing position substantially independent of galvanometer sensitivity and thermocouple resistance.

The general principles of my present invention may be used with advantage in various types of self-balancing potentiometric and control apparatus. For example, those principles may advantageously be used in the type of self-balancing potentiometric measuring and control apparatus devised by Walter P. Wills and disclosed in his prior application, Serial No. 421,173, filed December 1, 1941. In the last mentioned apparatus, the potentiometric rebalancing operations are effected by an electronic relay which is controlled by means responsive to current flow through the thermocouple and comprising a pulsator and a transformer in series with the thermocouple and operating to impress an alternating control voltage on the electronic relay varying in magnitude and phase with the magnitude and direction of the current flow through the thermocouple.

The apparatus disclosed in said prior Wills application includes electronic relay provisions which effects a safety control action and are analogolus to the means heretofore employed for effecting such action in potentiometers having rebalancing means controlled by galvanometers, in that in each case the measuring apparatus does not operate as a null type potentiometer when in its balanced condition, and in that in each case the maintenance of the balanced condition requires a current flow through the thermocouple and responsive means which is dependent in magnitude on the thermocouple resistance and on characteristics of the responsive means.

A specific object of the present invention is to provide an improvement in the apparatus disclosed in said prior Wills application which will make the thermocouple current maintained in the balanced condition of the apparatus substantially independent of the thermocouple resistance and the sensitivity or other variable characteristics of the responsive means. The present invention may be used in measuring and controlling in accordance with small voltage variations produced by devices other than thermocouples.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figures 1, 2:
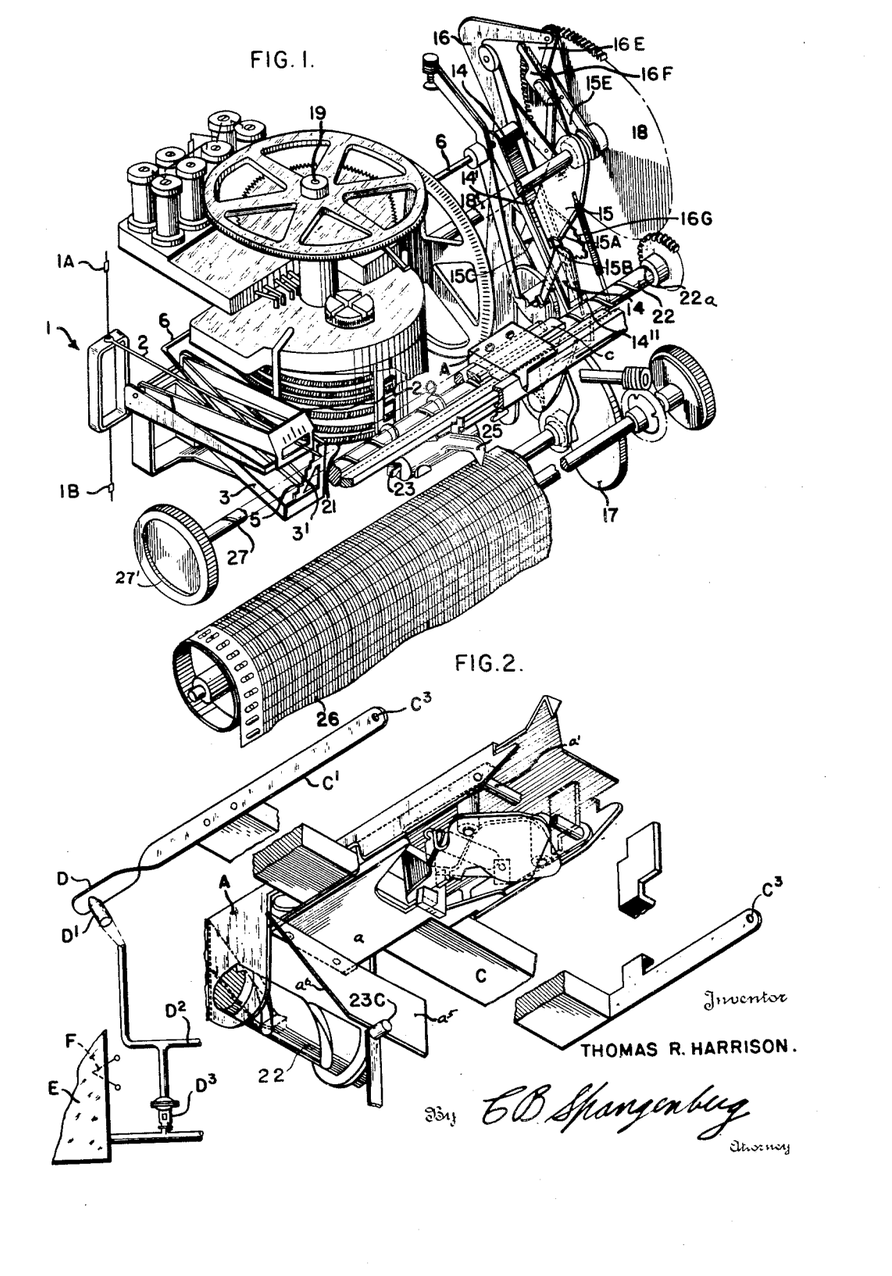
Fig. 1 is a perspective view showing the operative parts of a potentiometric mechanism included in one embodiment of the invention.
Fig. 2 is a perspective view of control elements of the mechanism shown in Fig. 1.

In Figs. 1–4, I have illustrated the use of the present invention in self-balancing potentiometric apparatus of a well known recording-controlling type. The potentiometric structure shown in Figs. 1 and 2 is of the type fully shown and described in the Harrison Patent 1,946,280 of February 6, 1934, and the Harrison et al. Patent 2,150,502 of March 14, 1939, and the control provisions shown in Fig. 2 are of the character shown in the Harrison Patent 2,112,091 of March 22, 1938. Inasmuch as the apparatus shown in Figs. 1–4 is well known, it seems sufficient to describe said apparatus only to the end of facilitating a ready understanding of the manner in which it operates, when included in a desirable embodiment of the present invention.

The apparatus shown in Fig. 1, comprises a galvanometer 1 having a pointer 2 which deflects in response to variations in the value of a condition to be measured, and by its deflection controls the rebalancing of the potentiometer circuit. This pointer, depending upon its position, is periodically engaged by one of the steps 5, of a gauging member 3 that acts through a shaft 6 to position a secondary pointer 14. The neutral control or balancing position of the galvanometer is that in which the galvanometer pointer 2 is directly above the mark 3' on the stepped portion of the gauging element 3. A constantly rotating cam 17 driven by a motor not shown, oscillates a pawl carrying lever 16 from a fixed position to a position governed by engagement between one of the steps on a member 16G attached to lever 16 and a projection 14" on the end of the secondary pointer 14.

As the lever 16 moves to the right in Fig. 1 into its above mentioned variable position, one of the pawls 16E or 16F carried thereby engages a tooth on the edge of large gear 18 to rotate that gear. Which of the pawls 16E or 16F then engages gear 18 and thereby determines the direction of rotation of the gear, depends upon the deflection of the galvanometer pointer 2 to one side or the other of its neutral or balancing position. This is controlled by the engagement of one or another of the steps 15A, 15B or 15C of a member 15 with the edge of an opening 14' in the secondary pointer. If step 15B engages with the opening edge, as it will when the galvanometer pointer is in balancing position, neither of the pawls will engage gear 18. When, however, either step 15A or 15C engages the edge of opening 14', as it will when the value of the condition is below or above what it was during the last cycle of the instrument, an arm 15E connected with the member 15 will force either pawl 16E or 16F into engagement with the gear 18.

As the gear 18 rotates it rebalances the potentiometer circuit and shifts a recording pen along a chart. The first of these operations is accomplished by means of the shaft 18' that, through the gearing shown, rotates shaft 19. The rotation of the shaft 19 effects a proportional change in the longitudinal portion of a potentiometer slide wire resistance engaged by a contact 20, and thereby effects a rebalancing adjustment of the potentiometer circuit. The second or pen shifting operation is accomplished by means of a small gear 22a engaged and rotated by the gear 18 and carried on a helically threaded shaft 22 that is journalled in the side plates of the instrument. Supported on the shaft 22 is a pen carriage 23 which is moved along the shaft as the shaft rotates by means of engagement between a suitable pawl carried thereby and the helical thread of the shaft 22. Therefore, when the gear 18 is rotated in response to potentiometer unbalance, a pen 25 carried by the pen carriage 23 will be shifted across a chart 26 to record the value of the condition being measured. The movements of the pen carriage are proportional to the simultaneously effected relative movements of the contact 20 along the slide wire 21. The chart is moved under the pen at a constant speed by means of a constantly driven chart drum 26A.

The control provisions of the instrument comprise a control table A that is supported upon the frame of the instrument upon a threaded shaft 27 that is parallel to the shaft 22, and is provided at one end with a knob 27' by which it may readily be manually rotated. By rotating the shaft 27, the table A may be moved across the chart 26 to a position corresponding to the value at which it is desired to maintain the condition. A member a pivoted at a' to the control table A supports a downwardly extending cam member $a^5$. This cam member has an inclined edge $a^6$ adapted to engage a roller 23C carried by the pen carriage 23, and as the pen carriage 23 moves relative to the control table A, the member $a$ is turned up or down about its pivot $a'$ due to engagement of roller 23C and cam edge $a^6$. A bar C is attached to supporting levers or arms C' that are pivoted at $C^3$ in the side-frames of the instrument. This bar C is in sliding relation with the part $a$ so that the control table A may be shifted and is in engagement with part $a$ so that as part $a$ moves around its pivot $a'$ the bar C will be moved around pivots $C^3$ that are aligned with $a'$.

In order to vary the value at which the instrument tends to maintain the condition measured, it is only necessary to rotate the shaft 27 to thereby shift control table A to the proper position above chart 26. This may be accomplished either manually or by some power means such as a reversible motor connected thereto.

The manner in which movement of part $a$ and bar C with respect to the control table A is used to control the condition to which the galvanometer 2 is responsive may well be similar to that shown in Patent 2,112,091, above referred to, but is shown diagrammatically herein as comprising an extension D of the left arm C'. This extension acts as a flapper valve to vary the escape of air through a nozzle D' that is supplied from some suitable source past a restriction $D^2$ and that is also in communication with the diaphragm of a valve $D^3$. The valve $D^3$ regulates the passage of a fluid such as fuel to a furnace E and thereby controls the temperature thereof. In operation the bar C is raised and lowered in response to variations in the temperature of a thermocouple F located in the furnace E and connected into the potentiometer measuring circuit shown in Fig. 4 and hereinafter described. The up and down movements of the flapper D variably throttle the nozzle D' and thereby change the air pressure applied to the diaphragm of valve $D^3$ and thus produce corresponding variations in the rate at which fuel is supplied to the furnace E.

The particular manner in which the adjustment given the control bar C on changes in the value of the quantity measured by the potentiometric mechanism shown in Figs. 1 and 2, effect control operations, is not an essential feature or characteristic of the present invention. For example, in lieu of controlling the adjustment of a fluid pressure valve $D^3$ as shown in Fig. 2, the arm C' may carry a contact $D^5$ which as shown in Fig. 3, cooperating with stationary contacts $D^6$ to control the operation of a reversible electric motor $D^7$ through which the furnace fuel valve $D^8$ of Fig. 3 is given adjustments on variations in the furnace temperature of the character given the automatic control valve $D^3$ of Fig. 2.

Figures 3, 4, 5:
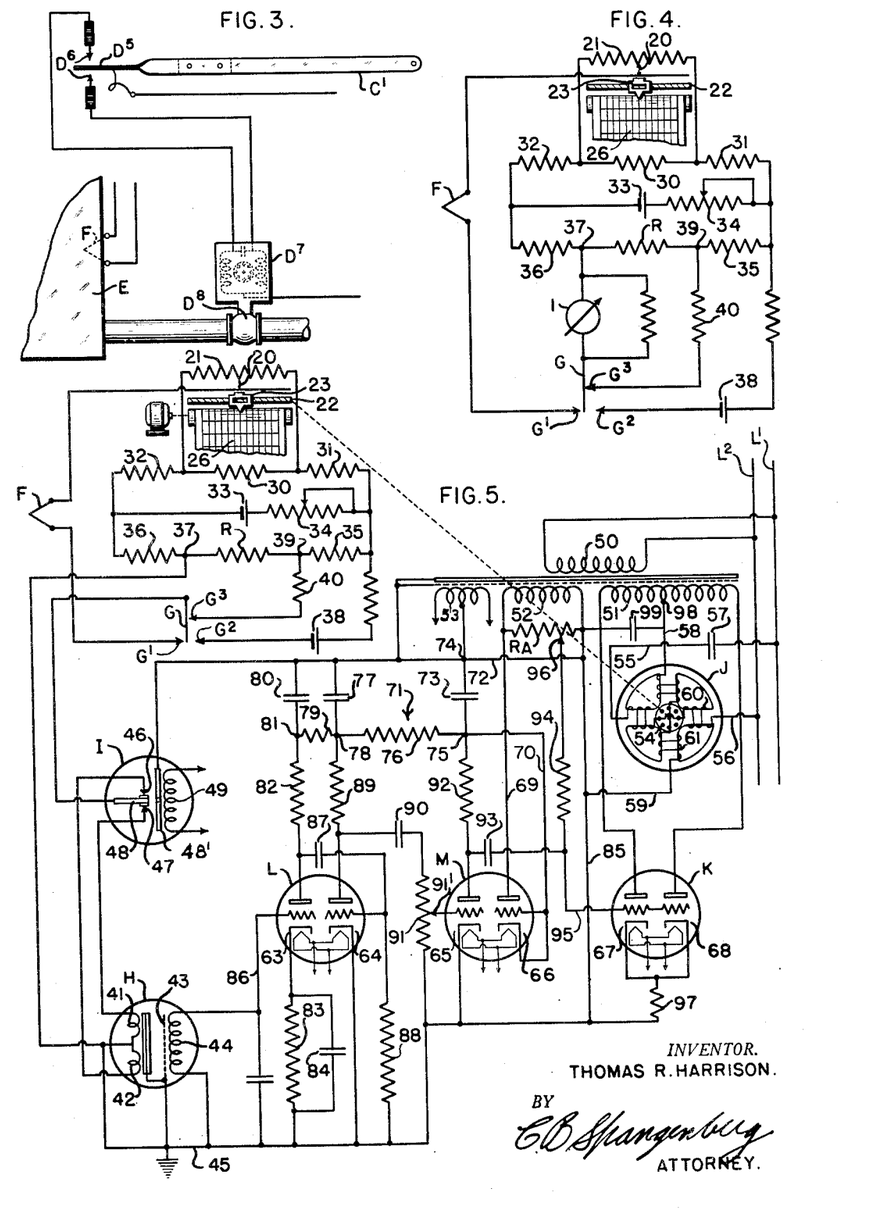
Fig. 3 is a diagrammatic representation of a modified form of control means shown in Fig. 2.
Fig. 4 is a diagram of circuit connections associated with the apparatus shown in Fig. 1.
Fig. 5 is a diagrammatic representation illustrating the use of the present invention in potentiometric apparatus of the conversion type.

In Fig. 4 I have diagrammatically illustrated a potentiometric measuring circuit suitable for use with the apparatus shown in Figs. 1, 2 and 3, and of conventional form except for its provisions hereinafter described, for effecting a calibration operation which determines the strength of the galvanometer current holding the galvanometer in its neutral or balancing position.

In the measuring circuit arrangement shown diagrammatically in Fig. 4, the potentiometer slide wire resistance 21 is connected in shunt to a resistance 30 which is connected in series with resistances 31 and 32 to form one of the three main branches of a split potentiometer bridge circuit. The energizing branch of that circuit includes a source of current 33 and the usual adjustable resistance 34 for regulating the strength of the bridge energizing current. The third main branch of the split potentiometer circuit includes a calibration resistance R provided for the purposes of the present invention and resistances 35 and 36 connected in series with the resistance R.

In Fig. 4 the thermocouple F has one terminal connected to the contact 20 and the galvanometer I has one terminal connected at the point 37 to the portion of the measuring circuit connecting the resistances R and 36, and the second terminals of the thermocouples F and galvanometer I are normally connected by a switch member G. The latter, which may be either manually or automatically controlled or adjusted, is shown as permanently connected to the second terminal of the galvanometer I and movable in and out of the position in which it engages the switch contact G' which is permanently connected to the second terminal of the thermocouple.

The switch G is angularly movable between one end position in which it engages the contact G' and a second end position in which it engages a contact $G^2$. In an intermediate position, the switch G' engages a contact $G^3$ without engaging either of the contacts G' and $G^2$, but in moving from its intermediate position into engagement with the contact $G^2$ the switch member G remains in engagement with the contact $G^3$. The contact $G^3$ is connected at the point 39 to the portion of the bridge circuit connecting the resistance R to one terminal of the resistance 35, and the second terminal of the resistance 35 is connected to the contact $G^2$ by a circuit branch including a standard cell 38. Advantageously, and as shown, a resistance 40 is included in the connection between the contact $G^3$ and the circuit point 39.

When the switch G is in engagement with the contact $G^2$ it serves the customary bridge circuit calibration switch purpose of establishing a circuit branch including a standard cell, 38, and a galvanometer, I, in which the E. M. F. of the standard cell opposes the tendency of the potential drop across the resistance 35 to cause a current flow through the galvanometer I. In Fig. 4, said potential drop is due to the current flow through the resistance 35 from the bridge energizing battery 33 and progressively diminishes as said battery ages and its E. M. F. decreases, unless compensated for by suitable reduction in the amount of the adjustable resistance 34 included in the bridge circuit. When the adjustment of the resistance 34 in circuit is that required to properly calibrate the bridge circuit, the potential drop in the resistance 35 is exactly equal in magnitude to the E. M. F. of the standard cell 38. In effecting such a bridge circuit calibrating adjustment as is necessary from time to time to compensate for the reduction in the E. M. F. of the battery 33 occurring as the battery ages, the switch G is moved into its second end position in which it engages the contact $G^2$, and the resistance 34 is then adjusted as required for the deflection of the galvanometer pointer into the same deflection position occupied by the pointer when the switch G is in its intermediate position in which it engages the contact $G^3$ but does not engage the contact $G^2$. As will be apparent, for the same galvanometer deflection with the switch G in its intermediate and second positions, it is essential that the current flow through the galvanometer should not change when the movement of the switch G into engagement with the contact G² connects the standard cell 38 in circuit with the galvanometer. When the galvanometer and the bridge circuit are both properly calibrated for the purposes of the present invention the said deflection position of the galvanometer is the same as its balancing position.

When the switch G engages the contact G³, the galvanometer 1 is included in a high resistance shunt about the special calibration resistance R, and the potential drop in the resistance R causes a current flow through the galvanometer. The galvanometer 1 is properly calibrated for the purposes of this invention when its mechanical zero position is so displaced from its balancing position, that when the bridge circuit is properly calibrated and the switch G is in its intermediate position in which it engages the contact G³ without engaging the contact G², the current flow through the galvanometer due to the potential drop in the calibration resistance R is that required for the deflection of the galvanometer pointer into its balancing position. While the magnitude of that current flow depends upon the galvanometer resistance, it is independent of the galvanometer sensitivity. The galvanometer deflection produced by said current flow is dependent upon the galvanometer sensitivity, however, and is utilized, to make the magnitude of the current flow through the galvanometer which in normal operation holds the galvanometer in its balancing position, equal to the current flow through the galvanometer when the latter is connected in shunt to the resistance R as above described.

To make the two last mentioned current flows equal in value, the mechanical zero of the galvanometer is adjusted into such position that the galvanometer will occupy its neutral or balancing position when the switch member G is in engagement with the contact G³.

As will be apparent, the effect of the described adjustment of the mechanical zero position of the galvanometer is to displace that position from the balancing position of the galvanometer by an angular movement which is directly dependent on the galvanometer sensitivity and is greater or less accordingly as the galvanometer sensitivity is relatively great or relatively small.

The galvanometer mechanical zero may be adjusted in a manner well known to the art. Ordinarily, the galvanometer includes provisions for effecting such an adjustment by angularly adjusting the suspension elements for the movable galvanometer coil corresponding to those diagrammatically shown and designated 1A and 1B in Fig. 1. One desirable form of such mechanical zero adjusting provisions is fully disclosed in the above mentioned Patent 2,150,502.

The mechanical zero position of the galvanometer established as above described, is displaced to the left of its balancing position which is that in which the galvanometer pointer 2 is directly above the mark 3'. In consequence, when the galvanometer turns into its mechanical zero position as a result of a thermocouple burn-out or other apparatus failure, the galvanometer will coact with the gauging element 3 to bring the secondary pointer 14 into operative engagement with the step 15C of member 15 and thereby effect a movement of the pen carriage 23 toward the right or high temperature end of its range of movement and thus through the pen carriage projection 23C and cam $a^5$ close the fuel supply valve D³, just as it is closed in normal operation when the temperature of the thermocouple F rises above its normal value.

While the apparatus shown in Figs. 1 and 2 functions as a deflection potentiometer rather than a null type potentiometer in making the measurement which is made when the galvanometer is in its balancing position, the accuracy of that measurement is not dependent on thermocouple resistance or on galvanometer sensitivity. Furthermore, the accuracy of that measurement is not dependent on the extent of galvanometer deflection produced by any current flowing through the galvanometer, except current of the particular magnitude which is required to hold the galvanometer in its balancing condition and which is equal to the magnitude of the current flowing through the galvanometer in the calibration operation in which the galvanometer is connected in shunt to the resistance R.

In Fig. 5, I have diagrammatically illustrated how by means of a few simple electric circuit changes, a desirable form of the present invention may be incorporated in potentiometric measuring and control apparatus of a type disclosed in the above mentioned prior application of Walter P. Wills.

The apparatus shown diagrammatically in Fig. 5 includes a potentiometric measuring circuit arrangement identical with that shown in Fig. 4, except that the current responsive apparatus connected between the circuit point 37 and the switch contact G' of Fig. 5, when that contact is engaged by the switch member G is not a galvanometer, but comprises a primary winding of a transformer H and a pulsator or vibrator I which converts the current generated by the thermocouple voltage into a pulsating current, so that the secondary voltage generated in the transformer H is an alternating voltage adapted for electronic amplification.

As diagrammatically shown, the primary winding of the transformer comprises two sections 41 and 42 which have their adjacent ends connected together and to the measuring circuit point 37. The core structure and casing of the transformer H and a shield 43 interposed between the transformer primary windings and its secondary winding 44 are connected to a grounding conductor 45. The remote ends or terminals of the primary winding sections 41 and 42 are connected to the stationary contacts 46 and 47 respectively of the vibrator I. The latter comprises a vibrating reed 48 carrying a contact moved by the vibration of the reed back and forth between the contacts 46 and 47 which it alternately engages.

The contact 48 is connected to the calibration switch member G of Fig. 5. The reed 48 is caused to vibrate by a winding 49 having its terminals connected to a source of alternating current. A permanent magnet 48' is associated with the reed 48 for polarizing and synchronizing purposes, and in operation the reed 48 is in continuous vibration with a frequency corresponding to that of the source of energization for the winding 49. In consequence, the currents flowing alternately through the winding sections 41 and 42 creates alternating voltages in the secondary winding 44 well adapted for amplification in the electronic relay to the input terminals of which the terminals of the transformer secondary windings are connected.

Said electronic relay comprises a drive section and an amplifying section, both of which receive energizing current from a transformer having its primary winding 50 connected to the supply conductors L' and L² and having three secondary winding sections 51, 52 and 53. The drive section of the electronic relay comprises a reversibly rotating motor J and an electronic tube K. The amplifying section comprises amplifying tubes L and M.

The motor J, as diagrammatically shown, comprises a rotor 54 mechanically coupled to the threaded shaft 22, the rotation of which, as diagrammatically shown, simultaneously adjusts the contact 20 and the pen carriage 23. The motor J has a pair of terminals 55 and 56 connected through a condenser 57 of suitable value to the alternating supply conductors L' and L², and has a second pair of terminals 58 and 59 connected respectively to midpoint of the secondary winding 51 and to one end terminal of the secondary winding 52 of the transformer. For its intended use, the motor J may be of the form schematically shown in the drawings in which one pair of oppositely disposed field poles are surrounded by a winding 60 connected between the motor terminals 55 and 56, and the other pair of poles are surrounded by a winding 61 connected between the motor terminals 58 and 59.

Due to the action of the condenser 57 the current flowing through the motor winding 60 will lead the voltage of the alternating supply conductors L' and L² by approximately 90°. The current supplied to the winding 61 will be approximately in phase with, or will be displaced 180° from the voltage of the alternating current supply conductors L' and L². The windings 60 and 61 thus establish fields in the rotor 54 which are displaced from one another approximately 90° in one direction or the other, depending upon whether the winding 61 is energized with current in phase with the voltage of the alternating supply conductors L' and L², or displaced 180° in phase therefrom. As will become apparent from the subsequent description, the phase of the current flow through the winding 61 and the rotation of the rotor 54 depends upon, and is controlled by the direction of unbalance of the potentiometric measuring circuit, and the duration of said rotation depends on the duration of said unbalance so that the rotation of the rotor tends to adjust the contact 20 to the extent as well as in the direction to rebalance said circuit.

The alternating voltage generated in the secondary winding 44 of the transformer H is amplified through the action of the amplifying tubes L and M and the amplification thus effected is utilized in energizing the phase winding 61 of the motor J to control the selective actuation of the latter for rotation of the rotor 54 in one direction or the other.

As shown, the electronic amplifying tube L includes two heating type triodes within the same envelope and designated by the reference symbols 63 and 64. The triode 63 includes anode, control electrode, cathode, and heater filament elements, and the triode 64 includes like elements. The filaments of the triodes 63 and 64 are connected in parallel and receive energizing current from the low voltage secondary winding 53 of the transformer I. The conductors through which the secondary 53 supplies current to the heater filaments of the electronic tubes L and also to the heater filaments of the tubes M and K, have not been shown in order not to confuse the drawings.

The electronic amplifying tube M includes two heater type triodes, designated by the reference characters 65 and 66, and within the same envelope. Both of the triodes of tube M include anode, control electrode, cathode and heater filament elements. The electronic tube K also includes two heater type triodes, which have been designated by the reference characters 67 and 68, within the same envelope, and including anode, control electrode, cathode, and heater filament elements.

The triode 66 of the electronic valve M is utilized as a half wave rectifier to provide a source of direct current voltage for energizing the anode or output circuits of the triodes 63, 64 and 65. As shown, the control electrode and cathode of the triode 66 are directly connected to each other and the output circuit thereof is energized by the transformer secondary winding 52 through a circuit which may be traced from the left end terminal of the winding 52, as seen in the drawings, through the conductor 69 to the anode of the triode 66, the cathode thereof, and through a conductor 70 to the positive terminal of a filter generally designated by the reference numeral 71. The negative terminal of filter 71 is connected by a conductor 72 to the right end terminal of the transformer secondary winding 52.

The filter 71 includes a condenser 73 which operates to smooth out the ripple in the output voltage of the filter between the points 74 and 75. The filter 71 also includes a resistance 76 and a condenser 77 which operate to smooth out the output voltage of the filter between the points 74 and 78. The filter 71 includes a further resistance 79 and a condenser 80 for smoothing out the output voltage between the filter points 74 and 81. The filter, therefore, comprises three stages. Such a three-stage filter is provided because for satisfactory and efficient operation it is desirable that the anode voltage supplied to the triode 63 be substantially free from ripple whereas it is not necessary to supply anode voltage so completely free from ripple to the output circuit of the triode 64. Likewise it is not necessary to supply anode voltage as free from ripple to the triode 66 as to the triode 64.

The anode circuit of the triode 63 may be traced from the filter point 81, which comprises the positive terminal of the filter, through a fixed resistance 82 to the anode of the triode 63, to the cathode thereof, and through a cathode biasing resistance 83, which is shunted by a condenser 84, to the negative filter point 74 through the previously mentioned grounded conductor 45, a conductor 85 and a conductor 72. The cathode biasing resistance 83 and the parallel connected condenser 84 are utilized for biasing the control electrode of the triode 63 negatively with respect to the cathode.

The input circuit of the triode 63 may be traced from the cathode to the parallel connected resistance 83 and condenser 84 through the transformer secondary winding 44, and a conductor 86 to the control electrode of the triode 63.

The output circuit of the triode 63 is resistance capacity coupled to the input circuit of the triode 64 by means of a condenser 87 and a resistance 88. More particularly, the anode of the triode 63 is connected by condenser 87 to the control electrode of the triode 64 and the control electrode of the triode 64 is connected through the resistance 88 to the conductor 45 and thereby to the cathode of the triode 64. The anode circuit of the triode 64 may be traced from the positive terminal 76 of the filter 71 through a fixed resistance 89 to the anode of the triode 64, the cathode thereof, and conductors 45, 85 and 72 to the negative terminal 74 of the filter.

The output circuit of the triode 64 is resistance capacity coupled to the input circuit of the triode 65 by means of a condenser 90 which is connected between the anode of the triode 64 and the control electrode of the triode 65, and by means of a resistance 91 which is connected between the control electrode of the triode 65 and the cathode thereof. It is noted the resistances 88 and 91 which are connected in the input circuits of the triodes 64 and 65, respectively, operate to maintain the control electrodes of the triodes 64 and 65 at the same potentials as their associated cathodes when no voltage is induced in the transformer secondary winding 44, and upon the induction of an alternating voltage in the secondary winding 44, resistances 88 and 91 permit the flow of grid current between the control electrodes of the triodes 64 and 65 and their associated cathodes and thereby limit the extent the control electrodes of the triodes are permitted to go positive with respect to their associated cathodes. With the control electrode of triode 65 connected to the resistance 91 by an adjustable contactor 91', as shown, said resistance and contactor form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode, the cathode thereof, and conductors 72 and 85 to the negative terminal 74 of the filter. The output circuit of the triode 65 is resistance capacity coupled to the input circuits of the triode 67 and 68 by means including a condenser 93 and a resistance 94.

As illustrated the condenser 93 is connected by a conductor 95 to the control electrodes of the triodes 67 and 68, and is connected to the cathodes of those triodes through the resistance 94, a contactor 96 engaging and adjustable along the length of a potentiometer resistance RA, said resistance and the previously mentioned circuit contactor 85. The resistance RA is connected between the terminals of the secondary winding 52 of the transformer and the conductor 85 connects one terminal of the winding 52 to the cathodes of the valves 67 and 68.

The resistance RA is connected through the resistance 94 and conductor 95 to the control electrodes of the valves 67 and 68, and is provided in accordance with the present invention, to impress a regulable bias potential on the control electrodes of the valves 67 and 68, and thereby effect a safety control action of the motor J when current flowing through the primary winding of the transformer H is accidentally interrupted as a result of thermocouple burn-out or other apparatus failure.

As will be apparent, the resultant, or algebraic sum, of the signal voltage from the output circuit of the triode 65 and the bias potential derived from the potentiometer resistance RA, is impressed simultaneously and equally on both of the control electrodes of the triodes 67 and 68, and the resistance 94 and RA collectively limit the extent to which the control electrodes of the triodes 67 and 68 may be driven positive with respect to their associated cathodes.

Anode voltage is supplied the output circuits of the triodes 67 and 68 from the high voltage secondary winding 51 of the transformer. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through a fixed resistance 97 and the conductor 85 to the terminal 59 of the motor J. The terminal 58 of the motor J is connected to a center tap 98 on the transformer secondary winding 51. Thus, the triodes 67 and 68 are utilized for supplying energizing current to the phase winding 61 of motor J.

The motor J is preferably so constructed that the impedance of the winding 61 is of the proper value to match the impedance of the anode circuits of the triodes 67 and 68 when the motor is operating in order to obtain the most efficient operation. Preferably, the motor is so constructed that it has a high ratio of inductance to resistance, for example, of the order of 6–1 or 8–1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors L¹ and L² through the condenser 57. The condenser 57 is so selected with respect to the inductance of the motor winding 60 as to provide a series resonant circuit having a unity power factor. By virtue of the series resonant circuit, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors L¹ and L² because of the series resonant circuit. The voltage across the motor winding 60, however, leads the current by substantially 90° because of the inductance of the winding 60.

Energizing current is supplied the motor winding 61 from the transformer secondary winding 51 through the anode circuits of the triodes 67 and 68 through the circuits previously traced. A condenser 99 is connected in parallel with the motor winding 61 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 67 and 68, and accordingly, provides efficient operation. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, the anode of the triode 67 is rendered positive with respect to said center tap. Accordingly, the triodes 67 and 68 are arranged to conduct on alternate half cycles of the alternating current supplied by the supply conductors L¹ and L¹.

When no signal or grid bias is impressed upon the control electrodes of the triodes 67 and 68 pulsating unidirectional current of twice the frequency of the alternating voltage supplied by conductors L¹ and L² is impressed on the motor winding 61. When thus energized the motor J is not urged to rotation in either direction but remains stationary. Due to the relatively high direct current component of the current then flowing through the motor winding 61 the core structure of the motor J tends to become saturated whereby the inductive reactance of the motor winding 61 is relatively small. The condenser 99, in shunt to the motor winding 61 is so chosen that the condenser and motor winding then provides a parallel resonant circuit. This saturation of the core structure of the motor J operates to exert an appreciable damping effect on the rotor 54, or in other words, an effect tending to prevent rotation of the rotor 54. Consequently, if the rotor 54 has been rotating, saturation of the motor core structure operates to quickly stop the rotation.

When an alternating grid bias is impressed on control electrodes of triodes 67 and 68, the magnitude of the pulses of current flowing in the anode circuit of one triode 67 or 68 will be increased while the magnitude of the pulses of current flowing in the anode circuit of the other triode will be decreased. Accordingly, the pulses of unidirectional current supplied to the motor winding 61 during the first half cycle will predominate over those supplied the motor winding during the second half cycle. Which anode current will be increased depends upon whether the bias voltage is in phase or 180° out of phase with the voltage of supply conductors L¹ and L².

Such energization of the motor winding 61 operates to introduce therein an alternating component of current of the same frequency as that supplied by the alternating current supply conductors L¹ and L². This alternating component of current will be either in phase with or 180° out of phase with the alternating current flowing through the motor winding 60 depending upon which of the triodes 67 and 68 has its anode current increased by the prevailing grid bias, and with either phase relation the two currents produce a magnetic field in the motor core structure which rotates in one direction or the other, depending upon said current phase relation and effects rotation of the motor rotor 54 in the corresponding direction. Moreover, when the motor winding 61 is so energized the direct current component of the current flowing therein is decreased, and consequently, the saturation of the motor core structure is decreased with the result that the rotor damping effect is reduced.

In the normal operation of the apparatus diagrammatically shown in Fig. 5, the portion of the resistance RA connected between the cathodes and control electrodes of the triodes 67 and 68 constantly impresses a bias potential on those electrodes which is 180° out of phase with the voltage of the supply conductors L¹ and L² and thereby tends to rotate the rotor 54, of the motor J. For the purposes of the present invention, the electrical connections to the motor J and its mechanical connection with the pen carriage 23, are such that the rotor rotation resulting from the grid biasing action of the resistance RA is in the direction to move the pen carriage 23 up scale, i. e. toward the high temperature end of its range of movement, and thereby produce the desired safety action.

In normal operation, the grid bias potential impressed on the control electrodes of the triodes 67 and 68 by the resistance RA, is augmented, or is neutralized in whole or in part by the grid bias potential impressed on said electrodes through their connection by conductor 95 and condenser 93 to the anode circuit of the triode 65. The last mentioned grid bias potential is dependent in magnitude and direction upon the magnitude and direction of the pulsating current flow through the circuit including the thermocouple F, vibrator I and primary winding sections 41 and 42 of the transformer H.

When the temperature of the thermocouple F is steady and the positions of the pen carriage 23 and 20 are correct for that temperature, the grid bias potentials respectively transmitted to the controlling electrodes of the triodes 67 and 68 by the anode circuit of the triode 65, and by the resistance RA are equal in magnitude and 180° out of phase with one another. The resultant of the two grid bias potentials is then zero and the rotor 54 of the motor J has no tendency to rotate. When the neutralization of the two biasing actions is disturbed, the disturbance if due to an increase in the temperature of the thermocouple F, will result in a rotation of the motor which will move the pen carriage 23 up scale. Conversely, when the bias action balance is disturbed by a decrease in the thermocouple temperature, the motor will give the pen carriage a down scale adjustment. Regardless of the actual furnace temperature, on a thermocouple burnout or analogous apparatus failure resulting in no current flow through the secondary 44 of transformer H, the grid bias action of the resistance RA will operate the motor J in the direction to give the carriage 23 an up scale safety action adjustment.

The apparatus disclosed in Fig. 5 does not differ significantly from that disclosed in the previously mentioned prior application of Walter P. Wills, except in two respects:

*First.*—The apparatus disclosed in the Wills prior application does not include means like, or equivalent to, those shown in Fig. 5 for connecting the vibrator I and primary windings of the transformer H across the terminals of the resistance R.

*Second.*—While the said prior application discloses a resistance associated with the secondary transformer winding corresponding to the winding 52 shown in Fig. 5, so as to constantly transmit a fixed bias potential to the control electrodes of the triodes 67 and 68, the prior application disclosed no means for readily varying the magnitude of the bias potential thus transmitted, as the magnitude of the bias potential transmitted from the resistance RA of Fig. 5 can be adjusted by moving the contact 96 along the resistance RA.

In consequence of the differences referred to, the apparatus disclosed in my prior application is inherently liable to a small measuring inaccuracy because the magnitude of the safety bias potential transmitted to the motor energizing triodes corresponding to the triodes 67 and 68 of Fig. 5, is not suitably related to the sensitivity or responsiveness of the current responsive means which in Fig. 5 comprises the transformer H and the vibrator I. The safety action in the circuit shown was original with me.

The inclusion in an electronic relay of the general character shown herein and in the prior application referred to, of the means disclosed and claimed in said prior application for effecting a safety action in case of a thermocouple burn-out or like constituted a real improvement in the art, notwithstanding its above mentioned inherent liability to a small measuring inaccuracy. Nevertheless, the elimination of the liability to that inaccuracy is practically desirable, and such elimination is made possible with the apparatus shown in Fig. 5 by reason of its inclusion of the features giving rise to the above mentioned differences between the apparatus shown in Fig. 5 and that disclosed in the prior application.

With the apparatus shown in Fig. 5 I am able to readily establish a suitable relation between the two bias potentials transmitted to triodes 67 and 68 from the resistance RA, and through the conductor 95. To accomplish this I first adjust the switch member G of Fig. 5 into engagement with the contact G³ and thereby connect the circuit branch including the vibrator I and primary of the transformer H across the terminals of the resistance R. After thus establishing a calibrating current flow through the primary windings 41 and 42 transformer H, I adjust the contact 96 along the resistance RA into the position in which the potential transmitted from that resistance to the control electrode of the triodes 67 and 68, is equal in magnitude to, and therefore neutralizes the bias potential transmitted to said electrodes through the conductor 95 and created by the current flow through the secondary winding of the transformer H. The attainment of the proper adjustment of the contact 96 will be made readily apparent by the fact that it eliminates all tendency of the rotor 54 of the motor J to turn in either direction.

After the contact 96 has been adjusted as described, the apparatus may be restored to its normal measuring and control condition by moving the switch member G into engagement with the contact G'. In its subsequent normal operation, as the temperature of the thermocouple F changes the motor J will adjust pen carriage 23 and slide wire contactor 20 as required to bring their positions into correct correspondence with the existing thermocouple temperature, and the relation between thermocouple temperature and pen carriage position will not be varied significantly by such variations in thermocouple resistance or in the operating characteristics of the vibrator I and the transformer H, as are to be expected in such apparatus parts when commercially produced in relatively large quantities.

By the use of the relatively simple calibration features disclosed in Fig. 5, but not in the prior application of Wills, I obtain the same general advantages in self-balancing potentiometer measuring and control apparatus comprising an electronic relay and no galvanometer, as I obtain in potentiometric measuring and control apparatus in which a galvanometer controls the rebalancing operation, by the use of the form of my present invention illustrated in Figs. 1, 2 and 4.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. Self-balancing potentiometric measuring and control apparatus comprising in combination, a bridge circuit including a potentiometer resistance and a source of bridge circuit energizing current, a contact engaging and adjustable along said resistance, a source of voltage to be measured, current responsive means, means operating in the calibration of the apparatus to connect said responsive means in shunt to a portion of said bridge circuit in which a potential drop occurs and thereby cause a calibration current to flow through said responsive means, means operating in the normal operation of said apparatus to connect said voltage source and responsive means in series between said contact and a point in said circuit displaced from said contact and differing in potential from the latter by an amount which may be made greater or less than the voltage of said source by adjustment of said contact, and means controlled by said responsive means and operating when said source and responsive means are so connected in series to adjust said contact along said resistance in the direction tending to maintain a predetermined correspondence in value between the current then flowing through said responsive means and said calibration current.

2. Self-balancing potentiometric measuring and control apparatus comprising in combination a bridge circuit including a potentiometer resistance and a source of bridge circuit energizing current and a calibration resistance, a contact engaging and adjustable along said potentiometer resistance, a source of voltage to be measured, current responsive means, switching means operable to connect said responsive means in shunt to said calibration resistance so as to cause a calibration current to flow through said responsive means due to the voltage drop across said calibration resistance and alternatively operable to connect said voltage source and responsive means in series between said contact and a point in said circuit displaced from said contact and differing in potential from the latter by an amount which may be made greater or less than the voltage of said source depending on the adjustment of said contact, and means operating under control of said responsive means when said source and responsive means are so connected in series to adjust said contact along said resistance in the direction tending to maintain a current flow through said responsive means equal in value to the first mentioned current flow.

3. Self-balancing potentiometric measuring and control apparatus comprising in combination, a bridge circuit including a potentiometer resistance and a source of bridge circuit energizing current and a safety calibration resistance, a contact engaging and adjustable along said potentiometer resistance, a galvanometer, a source of voltage to be measured, switching means optionally adjustable into either of two conditions in one of which it connects said galvanometer and said source in series with one another between said contact and a point in said circuit displaced from said contact, and in the second of which conditions it connects said galvanometer in shunt to said calibration resistance, and means controlled by said galvanometer when said switching means is in said one condition for effecting adjustments of said contact along said potentiometer resistance tending to maintain a flow of current through said responsive means of a value corresponding to that of the current flowing through said galvanometer in said second condition of said switching means.

4. Self-balancing potentiometric measuring and control apparatus comprising in combination a bridge circuit including a potentiometer resistance, a safety calibration resistance and a source of bridge circuit energizing current, a contact engaging and adjustable along said potentiometer resistance, a galvanometer having one terminal connected to one terminal of said calibration resistance, a source of voltage to be measured having one terminal connected to said contact, switching means optionally adjustable into either of two conditions in one of which it connects the second terminal of the galvanometer to the second terminal of the thermocouple and in the second of which it disconnects said terminals and connects the second terminal of said galvanometer to the second terminal of said safety calibration resistance, and means controlled by said galvanometer when said switching means is in said one condition for effecting adjustments of said contact along said potentiometer resistance tending to maintain a flow of current through said galvanometer corresponding in value to the current flowing through the galvanometer in said second condition of said switching means.

5. Self-balancing potentiometric measuring and control apparatus comprising in combination, a bridge circuit including a potentiometer resistance and a source of bridge circuit energizing current, a contact engaging and adjustable along said resistance, a source of voltage to be measured, a galvanometer having mechanical zero and balancing positions displaced from one another by an amount dependent on and increasing with the sensitivity of the galvanometer and adapted to be held in its balancing position by the flow of a current of definite value through the galvanometer, a source of voltage to be measured connected in series with said galvanometer between said contact and a point of said circuit displaced from said contact, and rebalancing means controlled by the deflection of said galvanometer and effecting adjustments of said contact tending to maintain a current flow through said galvanometer of said definite value.

6. Self-balancing potentiometric measuring and control apparatus comprising in combination a bridge circuit including a potentiometer resistance and a source of bridge circuit energizing current and a safety calibration resistance, a contact engaging and adjustable along said potentiometer resistance, current responsive means having one terminal connected to one terminal of said calibration resistance, a source of voltage to be measured having one terminal connected to said contact, switching means optionally adjustable into either of two conditions in one of which it connects the second terminal of said responsive means to the second terminal of said source and in the second of which it disconnects said second terminals and connects the second terminal of said responsive means to the second terminal of said safety resistance, means controlled by said responsive means when said switching means is in said one condition for effecting adjustments of said contact along said potentiometer resistance tending to maintain the current then flowing through said responsive means at a value corresponding to that of the current caused to flow through the responsive means by the potential drop in said calibration resistance in said second condition of said switching means, and means controlled by said responsive means for effecting control actions selectively dependent on the adjustment of said contact.

7. Self-balancing potentiometric measuring and control apparatus comprising in combination, a bridge circuit including a potentiometer resistance and a source of bridge circuit energizing current, a contact engaging and adjustable along said resistance, a source of unidirectional voltage to be measured, current responsive means including means for converting unidirectional voltage impressed on said means into alternating voltage, means operative in a calibration condition of the apparatus to impress a unidirectional calibration voltage on said responsive means and thereby create a calibration current flow through said responsive means, means operative in a normal operation condition of said apparatus to connect said voltage source and responsive means in series between said contact and a point in said circuit differing in potential from said contact by an amount which may be made greater or less than the voltage of said source by adjustment of said contact, an electronic relay for effecting adjustments of said contact along said potentiometer resistance tending when the apparatus is in its normal operation condition to maintain flow through said responsive means of a current having a value corresponding to that of the calibration current flow, said relay comprising an amplifying section directly controlled by said responsive means and on which said alternating potential is impressed by said responsive means, a reversible motor drive section operative to effect the said adjustments in selective accordance with the net control bias potential impressed on said drive section and on which said amplifying section impresses a variable control bias potential, and means for impressing a non-variable bias potential on said drive section effective to neutralize the bias potential impressed on said drive section by said amplifying section when current of the value of said calibration current is flowing through said responsive means.

8. Self-balancing potentiometric measuring and control apparatus comprising in combination, a bridge circuit including a potentiometer resistance and a source of bridge circuit energizing current, a contact engaging and adjustable along said resistance, a transformer having a primary winding and a secondary winding, a source of unidirectional voltage to be measured, current responsive means including a pulsator and said primary winding, means operative in a calibration condition of the apparatus to impress a unidirectional voltage on and thereby pass a calibration current through said responsive means, means operative in a normal operation condition of said apparatus to connect said voltage source and responsive means in series between said contact and a point in said circuit differing in potential from said contact by an amount which may be made greater or less than the voltage of said source by adjustment of said contact, an electronic relay for effecting adjustments of said contact along said potentiometer resistance tending when the apparatus is in its normal operation condition to maintain a current flow through said responsive means equal to said calibration current, said relay comprising an amplifying section directly controlled by said responsive means and energized by said secondary winding, a reversible motor drive section operative to effect the said adjustments in selective accordance with the net control bias potential impressed on said drive section and on which amplifying section impresses a variable control bias potential, and means for impressing a non-variable bias potential on said drive section effective to neutralize the bias potential impressed on said drive section by said amplifying section when current equal to said calibration current is flowing through said responsive means.

THOMAS R. HARRISON.